United States Patent
Gretz (10) Patent No.: US 6,742,748 B1
(45) Date of Patent: Jun. 1, 2004

(54) DECK POST

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 10/252,781

(22) Filed: Sep. 23, 2002

Related U.S. Application Data (63) Continuation-in-part of application No. 10/112,563, filed on Mar. 28, 2002, which is a continuation-in-part of application No. 09/860,064, filed on May 17, 2001.

(51) Int. Cl.[7] .................................................. F21V 7/00
(52) U.S. Cl. ........................ 248/156; 248/530; 248/85; 248/87; 312/431
(58) Field of Search ........................... 248/49, 74.2, 65, 248/67.7, 68.1, 72, 156, 530, 87, 85, 545; 312/431; 362/431

(56) References Cited

U.S. PATENT DOCUMENTS

| | | | | |
|---|---|---|---|---|
| 3,257,496 A | * | 6/1966 | Hamilton | 174/38 |
| 3,435,124 A | * | 3/1969 | Channell | 174/38 |
| 3,466,379 A | * | 9/1969 | Lohman | 174/38 |
| 3,585,456 A | * | 6/1971 | Phillips, Jr. | 317/112 |
| 3,652,779 A | * | 3/1972 | Grinols | 174/38 |
| 4,519,657 A | * | 5/1985 | Jensen | 339/15 |
| 4,793,111 A | * | 12/1988 | Shewchuk | 52/298 |
| 4,858,877 A | * | 8/1989 | Carter | 248/545 |
| 4,951,182 A | * | 8/1990 | Simonson et al. | 362/145 |
| 5,184,279 A | * | 2/1993 | Horn | 361/356 |
| 5,586,742 A | * | 12/1996 | Carter | 248/545 |
| 5,901,525 A | * | 5/1999 | Doeringer et al. | 52/736.4 |

* cited by examiner

Primary Examiner—Korie Chan
Assistant Examiner—Steven Marsh (57) ABSTRACT

A mounting device that provides a stable platform and an enclosed junction box for securing an electrical fixture or any standard wall-mounted electrical device to an outdoor structure. The mounting device includes a base member and a post member. The base member is secured to the outdoor structure and the post member secured to the base to create a weatherproof housing. The junction box includes an access port that allows pulling of cable and space for completing wiring connections within the box. Any standard wall-mounted electrical device may be installed in the junction box. After installing the electrical device, the standard faceplate for the installed device is used to close the access port and thereby seal the electrical device from rain and moisture. The post member will also accept a standard electrical fixture such as a light.

3 Claims, 6 Drawing Sheets

DECK POST

This application is a Continuation-In-Part of U.S. patent application Ser. No. 10/112,563 entitled "Outdoor Garden Post", filed Mar. 28, 2002 and still pending, which in turn is a Continuation-In-Part of U.S. patent application Ser. No. 09/860,064 entitled "Landscape Fixture Support Post", filed May 17, 2001 and still pending.

FIELD OF THE INVENTION

The present invention relates to the field of devices providing outdoor electrical service, and more particularly to an enclosure that enables easy mounting of standard electrical fixtures, standard wall-mounted electrical devices, or both, to an outdoor structure or framework.

BACKGROUND OF THE INVENTION

Various devices have been proposed for mounting fixtures and electrical devices to an outdoor structure in order to provide illumination or other decorative effects to a landscape. Although the proposed devices generally provide a stable platform for mounting fixtures and devices, they usually are not configured to accept both standard wall-mount type electrical devices and standard outdoor fixtures. This forces the contractor or homeowner to obtain a non-standard electrical device or fixture for use with the mounting device. What is needed to simplify the task of installing outdoor electrical services to a structure, such as a deck, is a mounting device that provides a standard enclosure that meets the National Electrical Code's requirements for an electrical junction box paired with the ability to mount a standard electrical fixture, such as a light. For convenience and safety, the enclosure should provide space for electrical connections to both the electrical device and the fixture. The mounting device should be capable of using both standard wall-mounted electrical devices, such as duplex receptacles, and the standard cover member provided with the device. The mounting device should furthermore be capable of receiving a standard electrical fixture, such as a light, by accepting the standard mounting base on the fixture. Additionally, the mounting device should be aesthetically pleasing to the homeowner.

Two parent applications to this Continuation-In-Part application, U.S. patent application Ser. Nos. 09/860,064 and 10/112,563, disclosed mounting devices for installing standard electrical fixtures and standard wall-mounted electrical devices in a ground-contact location in an outdoor setting. The present disclosure provides many of the features of the parent applications but in a mounting device specifically for an outdoor structure, such as a deck, a patio surface, a walkway, or similar surface.

OBJECTS OF THE INVENTION

A significant advantage of the present invention is that it provides an electrical mounting device that includes a standard junction box that meets the requirements of the National Electrical Code. This enables the mounting device to accept any standard wall-mounted electrical device and gives the homeowner a wide range of options for mounting the devices to an outdoor structure. Applicable devices may include duplex receptacles, switches, photocells, motion sensors, infrared sensors, cameras, microphones, ground fault circuit interrupt (GFCI) receptacles, or any of a wide variety of typical wall-mounted devices.

Additionally, the mounting device provides an arrangement for easily mounting a light fixture. Wiring connections to the fixture may be completed within the junction box, therefore allowing either low voltage or line voltage fixtures to be used.

The mounting device further has the advantage of providing a rainproof enclosure for installation of electrical devices or fixtures.

As a further benefit of providing a standard junction box, the mounting device exhibits the advantage of easy maintenance and access to the electrical connections therein. The cover or faceplate for any installed device may easily be removed at any time to allow maintenance of the installed device.

A further advantage of the fixture-mounting device is that it is stable, durable, and may be easily and inexpensively manufactured. The mounting device can easily be produced by injection molding of a suitable polymer.

As a further advantage, the mounting device is simple to install and may easily be installed by a homeowner.

These, and other objects, will become readily apparent to one of skill in the art having regard for this disclosure.

BRIEF DESCRIPTION OF THE INVENTION

The present invention is a mounting device that provides a housing for mounting an electrical fixture or a standard wall-mounted electrical device on an outdoor structure. An electrical fixture, a standard wall-mounted electrical device, or a combination of each may be mounted therein. The mounting device includes a base member and a post member. An entryway is included in the base member for entry of electrical cables into the device and bosses are included for secure anchoring to a structure. The post member is secured to the base member to create a rainproof housing. A junction box is included within the post and an access port provides access to the box. Any standard wall-mounted electrical device may be installed in the junction box. After installing the electrical device, the standard faceplate for the installed device may be used to close the access port and seal the electrical device in a rainproof manner. The post member will also accept a standard electrical fixture.

REFERENCE NUMERALS USED IN THE SPECIFICATION AND DRAWINGS

20-deck post
22-base member 24-post member
26-bottom end of base member
28-integral bosses
30-fastener
32-base side walls
34-top end of base
36-interior surface of base side wall
38-exterior surface of base side wall
40-top of base side wall
42-bottom of base side wall
44-aperture
46-fastener
48-opening
50-post walls
52-top wall
54-aperture
56-light fixture
58-electrically conductive bushing
60-exterior threads of bushing
62-nut
64-grounding wire
66-shelf
68-junction box
70-access port
72-upper boss
74-lower boss
76-aperture for electrical device
78-gasket
80-electrical device (duplex receptacle)
82-faceplate
84-interior surface of post member walls
86-knockouts
88-inner end of shelf
90-outer end of shelf
92-lip
94-boss
96-coaxial apertures
97-shelf fasteners
98-channel
100-reduced wall thickness area
102-cap
104-sealing member
106-cap nut
108-cover member
109-cover member fastener
110-outdoor structure
111-aperture in post member
112-electrical cable
114-electrical device fastener
116-faceplate fastener

DETAILED DESCRIPTION

As this invention may be more easily explained by reference to the attached drawings, it should be noted that the figures are representative and exemplary of the invention only, and should not be construed as limiting the scope of the invention in any way.

The deck post of the present invention is an apparatus that may be anchored to an outdoor structure for the purpose of providing a housing for electrical services. The garden post is suitable for a wide range of fixtures and electrical devices that are typically mounted in an outdoor setting. Such fixtures and electrical devices include, but are not limited to, lighting fixtures, photocells, motion sensors, infrared sensors, cameras, microphones, receptacles, switches, ground fault circuit interrupt (GFCI) receptacles, and vibration detectors. The deck post of the present invention consists of a post member and a base member. The deck post provides a stable, easily serviceable, attractive mounting platform that is desirable for many applications and is inexpensive to produce and weather resistant.

Figure 9:
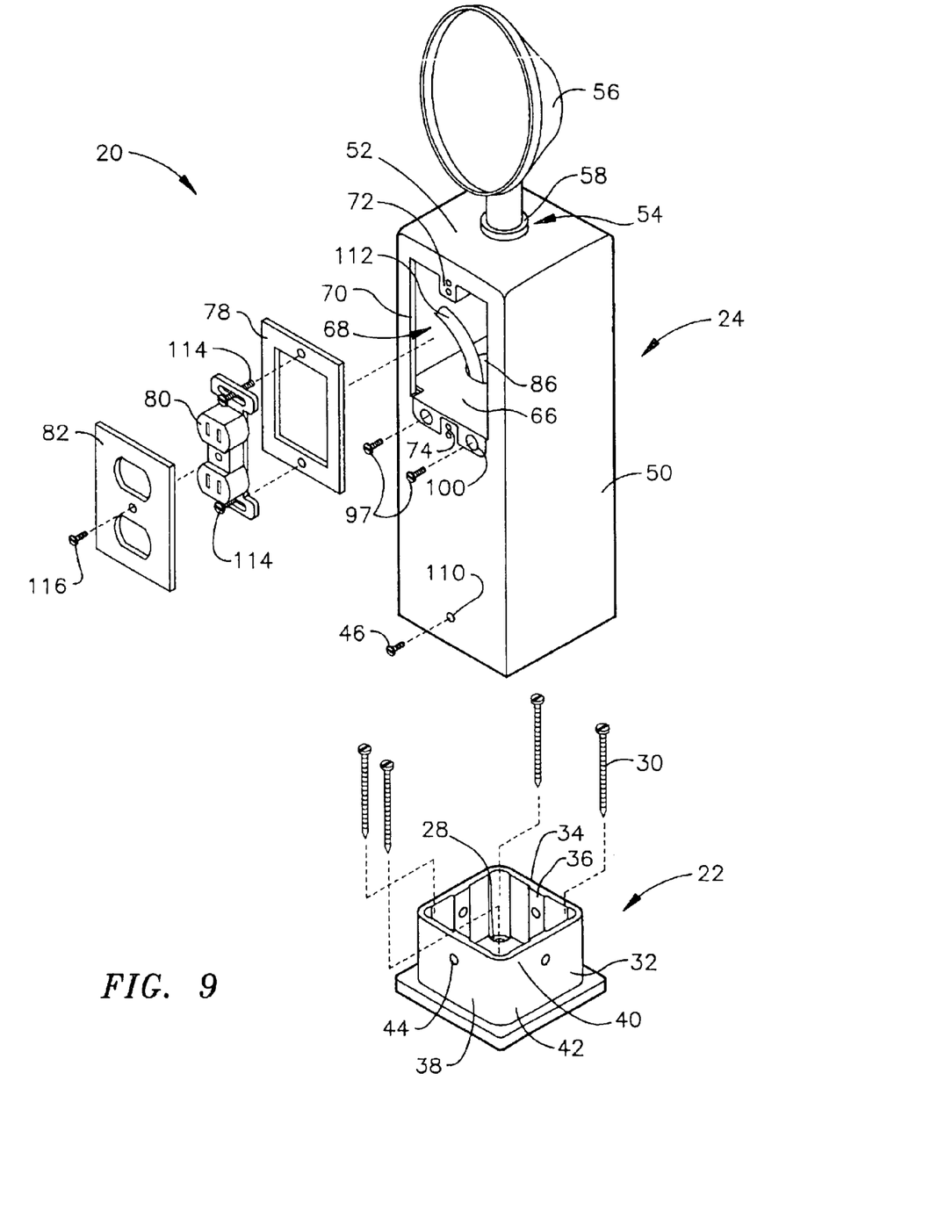
FIG. 9 is an exploded perspective view of the deck post of FIG. 1.

Referring now to FIG. 9, an exploded perspective view is shown of a deck post 20 according to the present invention. The preferred embodiment of the deck post 20 is comprised of two main components, including a base member 22 and a post member 24. The base member and post member 24 are typically rigid, hollow, and formed in an injection molding process with a sufficient wall thickness to support the combined fixture and make it sturdy enough to resist impacts from yard machinery when mounted to a deck or similar outdoor structure. A presently preferred material for forming the body is plastic such as polyvinyl chloride (PVC), polycarbonate, acrylonitrile-butadiene styrene (ABS), or polyethylene. Other materials may be used for construction of the base member 22 and post member 24 as well, such as metal.

Figure 3:
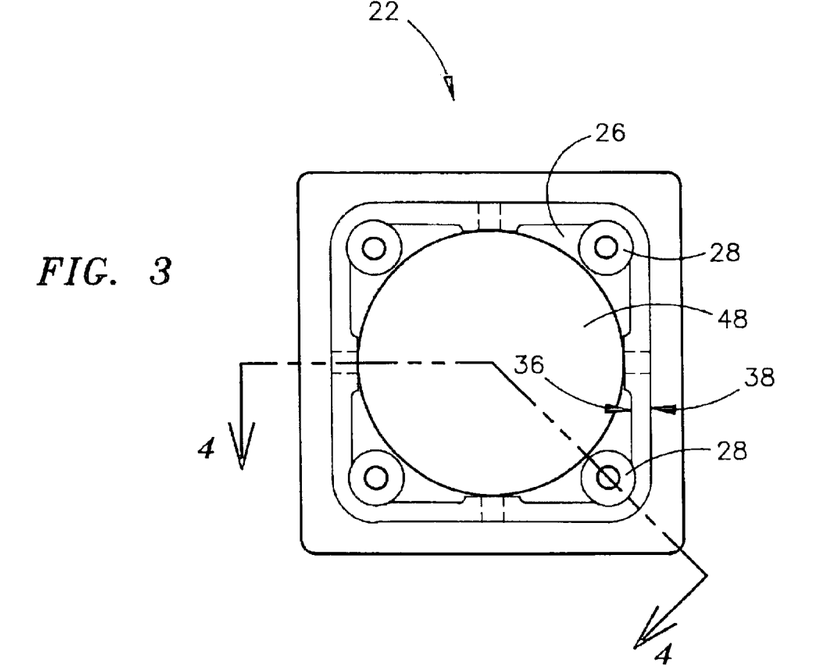
FIG. 3 is a top view of the base member of the deck post of FIG. 1.
Figure 4:
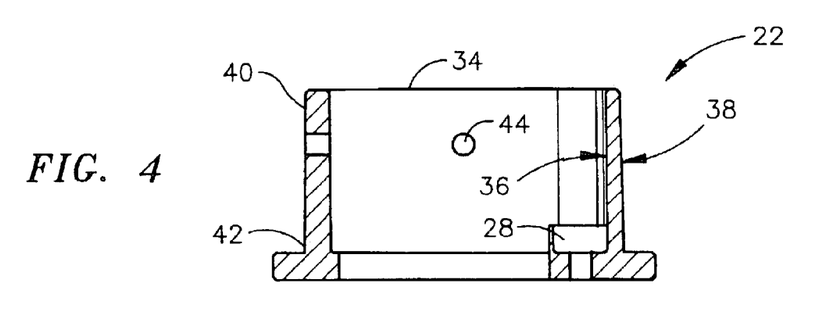
FIG. 4 is a side view of the base member of taken along line 4—4 of FIG. 3.

Referring now to FIGS. 3, 4, and 9 the base member 22 includes a bottom end 26 and two or more integral bosses 28 that will accept fasteners 30 for securing the base member 22 to a structure (not shown). Base side walls 32 are integral with the bottom end 26 and terminate in an open top end 34. The base side walls 32 have an interior surface 36 and exterior surface 38 with the exterior surface sloped such that the top exterior 40 of the base side walls 32 is of a smaller dimension than the dimension at the bottom exterior 42 of the base side walls 32. One or more apertures 44 are provided in the base side walls 32 to accept fasteners 46 for securing the post member 24 to the base member 22. Referring to FIG. 3, the bottom end 26 of the base member 22 includes an opening 48 to provide a pathway for feed wiring.

Figure 2:
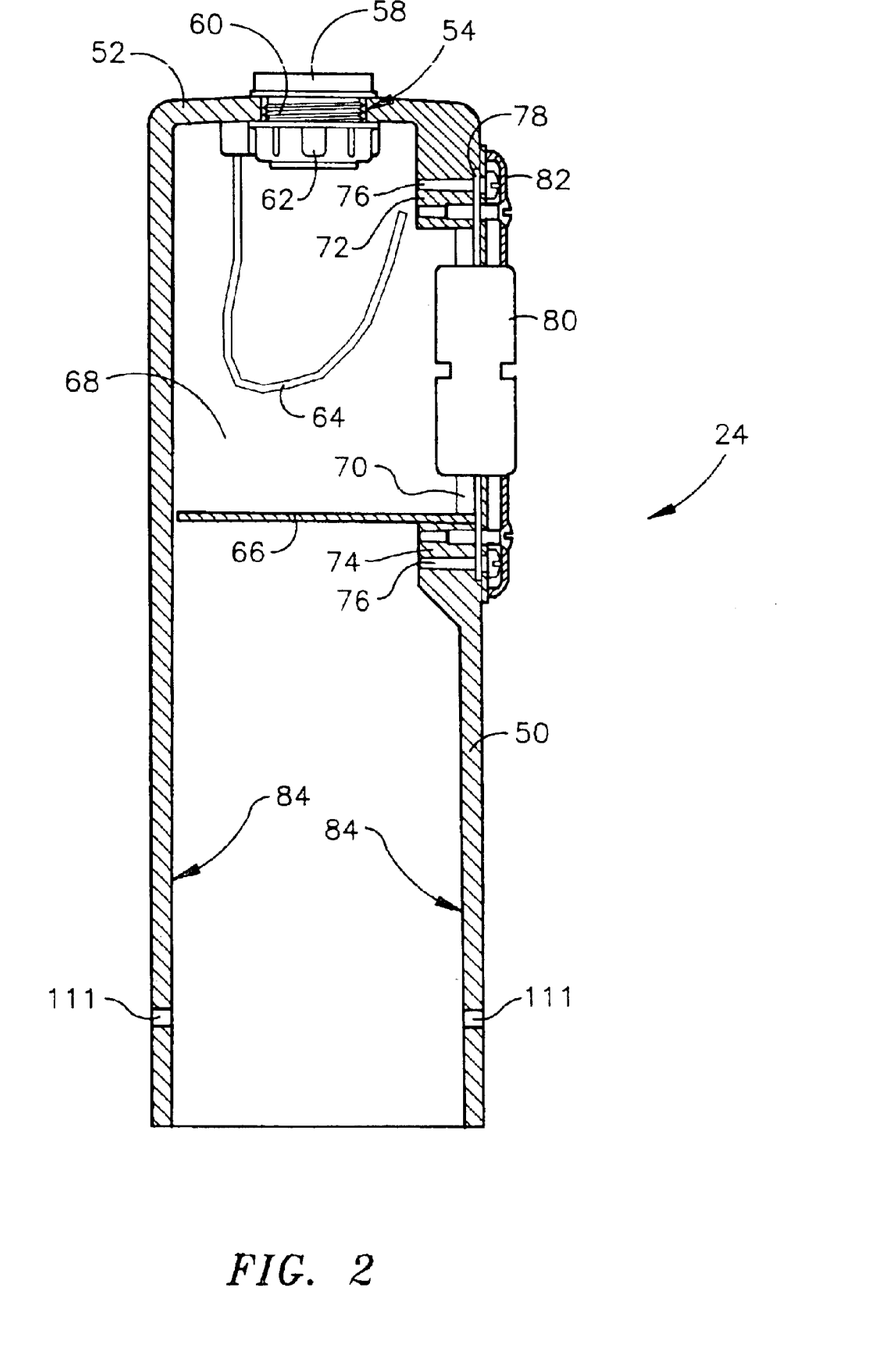
FIG. 2 is a cross-sectional view of the post member portion of the deck post of FIG. 1.

Referring to FIGS. 2 and 9, the post member 24 includes walls 50 shaped to conform to the shape of the base side walls 32. The post walls 50 are of a size to slip easily over the top exterior 40 of the base side walls 32 and fit the bottom exterior 42 of the base side walls 32. The post member 24 includes a top wall 52 that typically includes an aperture 54. The aperture 54 is adapted to accept a standard electrical fixture, such as the light fixture 56 shown in FIG. 9. Outdoor light fixtures 56 most typically are screwed into a support with the base of the light fixture typically containing a nipple with ½-inch NPT male threads. The aperture 54 in the top wall 52 of the post member 24 then typically is adapted to accept the nipple on the light fixture 56. The aperture 54 may therefore have female ½-inch NPT threads to accept a light fixture or other outdoor fixture directly into the threaded aperture. Alternately, as shown in FIG. 2, the aperture 54 in the top wall 52 may include an electrically conductive bushing 58 that is threaded interiorly and exteriorly 60 and secured to the top wall 52 by a correspondingly mated nut 62 that meshes with the exterior 60 threads of the bushing 58. A grounding wire 64 is typically connected to the electrically conductive nut 62 to provide a means of electrically grounding the fixture.

Further shown in FIGS. 2 and 9, a shelf 66 is secured within the hollow interior of the post member 24 to provide a junction box 68. An access port 70 is included in the post wall 50 to provide access to the junction box 68. The post walls 50 include a plurality of integral bosses, including an upper boss 72 at the upper end of the access port 70 and a lower boss 74 at the lower end of the access port with each of said bosses including several apertures 76 for securing a gasket 78 and an electrical device 80. Although the electrical device can be any standard wall-mount type device, the particular electrical device 80 shown in FIGS. 2 and 9 is a standard duplex receptacle. A standard faceplate 82 is secured to the electrical device 80 with the outer perimeter of the faceplate 82 typically sealing the access port 70 and the enclosed junction box 68 against rain and moisture.

Although the base member 22 and post member 24 may be constructed in various cross-sectional shapes, including rectangular, hexagonal, or octagonal, the most preferred shape is square or rectangular, such as depicted in the figures. After the shelf 66 is secured to the post member 24, the four walls of the post member 24 and the shelf 66 define a junction box 68 that is similar in size and shape to a standard wall-mounted junction box. It is preferred that the post member 24 be of a size to create a junction box large enough to accept a ground fault receptacle (not shown). An especially preferred embodiment of the post member 24 is of square cross-section and having a dimension of 2.94 inches between the interior surfaces 84 of the walls 50 of the post member 24. According to this especially preferred embodiment of the deck post 20, the junction box 68 typically measures 2.94 inches across by 3.90 inches long by 2.94 inches deep. These dimensions provide a junction box 68 that contains enough volume to accommodate any typical box mounted electrical device, including standard GFCI devices. Sufficient clearance is provided around the GFCI device and at least 2.0 inches depth behind it for accommodating the wiring connections. The access port 70 leading into the junction box 68 is typically 2.27 inches across by 3.35 inches long, also sized to accommodate a GFCI device or any other standard electrical device.

Preferably, the four walls of the post member 24 are from 0.1 to 0.5 inch thick. A preferred embodiment formed of polycarbonate or polyvinyl chloride is more preferably 0.15 to 0.25 inch thick. It is desired to keep the wall thickness as thin as possible while still providing the proper strength and rigidity for the assembled deck post, thereby lessening production costs. By providing a base member 22 and post member 24 formed by injection molding of a pigmented plastic, the assembled deck post 20 does not exhibit discoloration from chipping. Therefore, the deck post has the advantage of not showing chips and dents from accidental impact by lawn mowers, yard tools, and the like.

Figure 5:
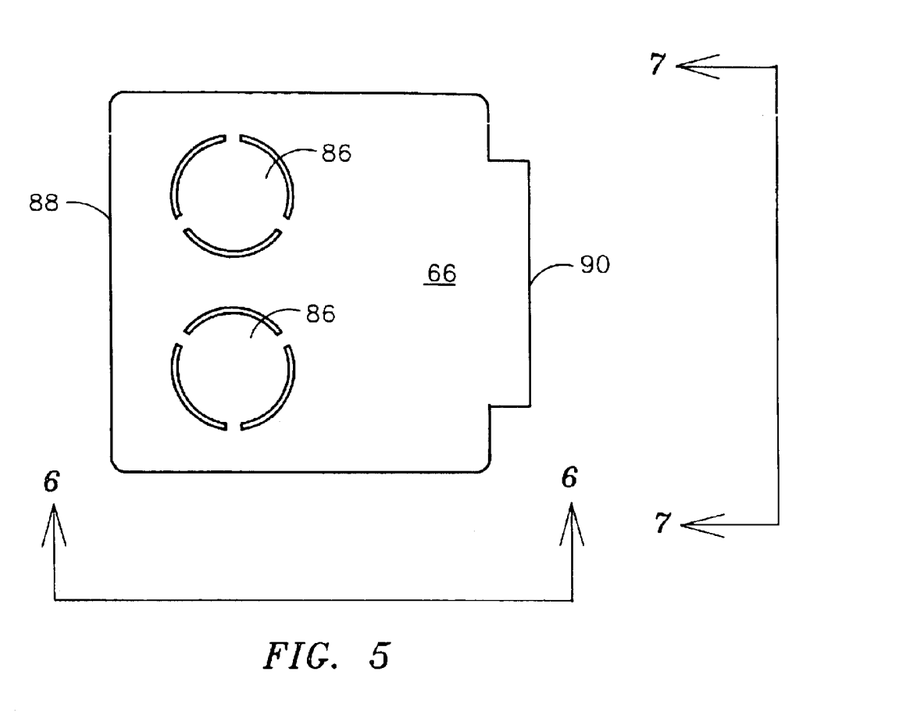
FIG. 5 is a plan view of a shelf member according to the present invention.
Figure 6:
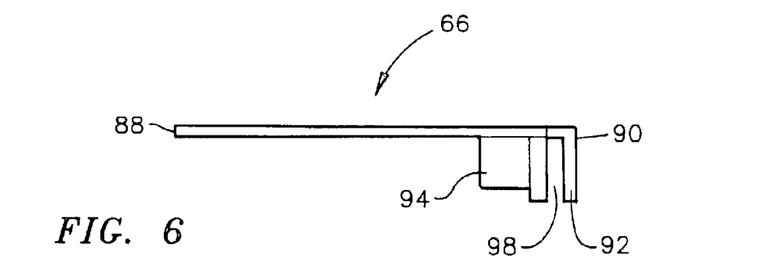
FIG. 6 is a side view of the shelf taken along line 6—6 of FIG. 5.
Figure 7:
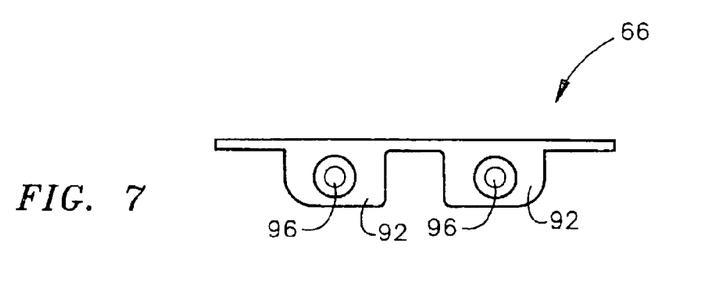
FIG. 7 is an end view of the shelf taken along line 7—7 of FIG. 5.

Referring now to FIGS. 5 through 7, the shelf 66 includes one or more areas where a portion of the shelf is removed to form knockouts 86. After the shelf is secured within the top member (not shown), the knockouts 86 can be easily punched out of the shelf to provide electrical supply wiring to the junction box. The shelf 66 has an inner 88 and outer 90 end. The outer end 90 of the shelf 66 includes a lip 92 and two bosses 94. As shown in FIG. 7, two lips 92 are preferred along with their bosses 94 (one in view in FIG. 6). Coaxial apertures 96 are provided in the lips 92 and bosses 94 to accept fasteners (not shown). The channel 98 between the lips 92 and bosses 94 accommodates the wall thickness of the post member (not shown) when fitted thereon.

Referring to FIGS. 6 and 9, the post member 24 preferably has a reduced wall thickness area 100 at the lower end of the access port 70 in the area that will accommodate the channel 98 of the shelf 66. The reduced thickness area 100 enables the outer surface of the lips 92, when secured to the reduced thickness area 100, to form an outer surface that is flush with the outer surface of the post member 24. The outer surface of the lips 92 and outer surface of the post member 24 surrounding the access port 70 will then present a flat surface to the gasket 78 and faceplate 82, thereby enabling a proper seal around the entire periphery of the faceplate 82. As shown in FIG. 9, fasteners 97 secure the shelf 66 to the post member 24 at the reduced wall thickness areas 100.

Figure 8:
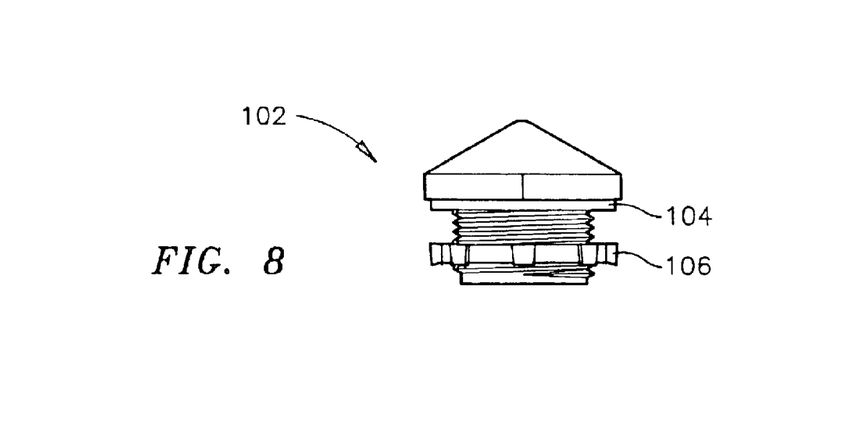
FIG. 8 is a side view of a cap and sealing member according to the present invention.

Referring now to FIGS. 2 and 8, a decorative cap 102 and sealing member 104 are provided to close off the aperture 54 in the top wall 52 of the post member 24 in those situations in which the garden post is used only for supporting an installed electrical device in the junction box 68, and no fixture. The cap 102 is threaded and secured to the top wall 52 by a cap nut 106. The cap 102 is provided with the outdoor garden post to enable sealing and weatherproofing the top of the garden post in those instances in which a user prefers to use the post for an electrical device mounted in the junction box but does not intend to attach a fixture to the top bushing.

Figure 10:
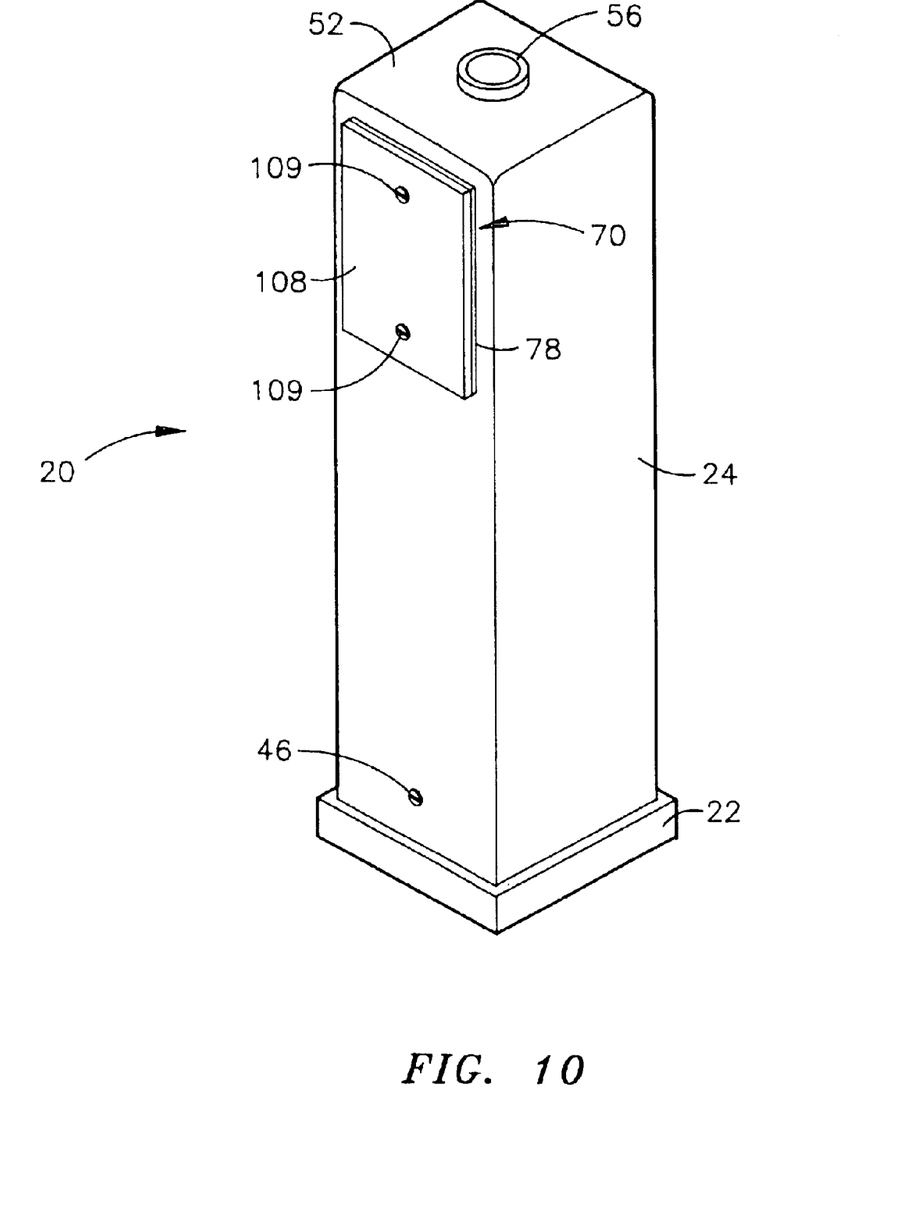
FIG. 10 is a perspective view of the deck post of FIG. 1 prior to installation in an outdoor setting.

Referring to FIG. 10, the deck post 20 of the present invention consists of a base member 22 and post member 24 and is typically supplied with a cover member 108, gasket 78, and electrically conductive bushing 58 installed in the top wall 52. The deck post 20 may be used to provide an electrical device, an electrical fixture, or one of each (not shown). If the deck post is configured to contain an electrical device only, a decorative cap and sealing member (not shown) may be used to seal the top wall of the post member 24 and the complementary faceplate (not shown) for the installed device is used to seal the access port 70 in place of the cover member 108. If the deck post is configured to provide a fixture but no electrical device, then, after wiring connections to the fixture are completed, cover member 108 is typically secured with fasteners 109 to seal the access port 70.

Figure 1:
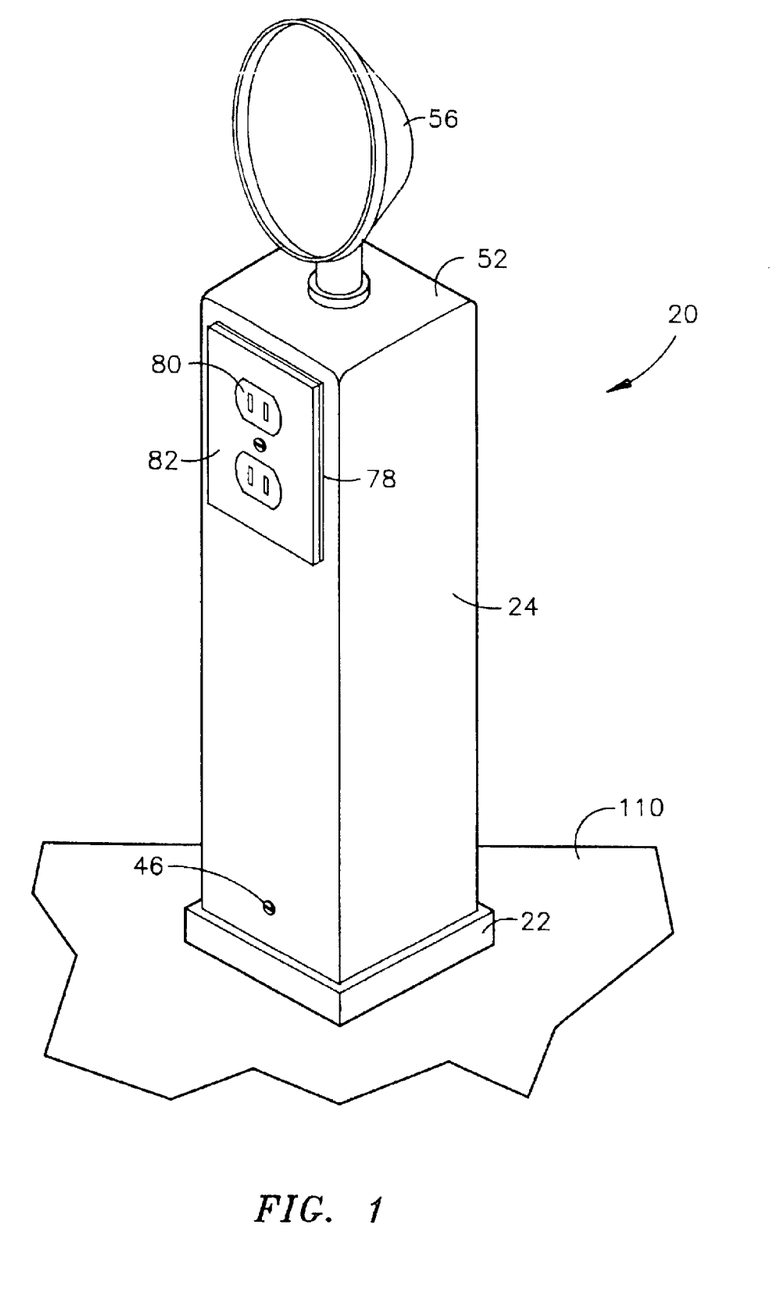
FIG. 1 is a perspective view of a preferred embodiment of the deck post of the present invention mounted to a structure and including a light fixture and a duplex receptacle.

FIG. 1 depicts the finished installation of a deck post 20 according to the present invention. A light fixture 56 has been installed on the top wall 52 of the post member 24 and a duplex receptacle 80 has been installed in the junction box within the post 24. The faceplate 82 and gasket 78 provide a rain tight seal for the deck post 20. The base member 22 has been secured to an outdoor structure 110, typically the surface of a deck, and secured by one or more fasteners 46 through the post member 24 and into the base member 22. The deck post as configured in FIG. 1 will provide a decorative and aesthetically pleasing housing supplying both light and electrical supply outlets. Other electrical devices can be installed such as such as switches, photocells, motion sensors, infrared sensors, cameras, ground fault circuit interrupt receptacles, or any of a wide variety of typical wall-mounted devices.

The deck post 20 of the present invention is typically packaged as shown in FIG. 10, with the post member 24 secured to the base member 22 by fastener 46, a gasket 78 and cover member 108 secured to the post member 24 by fasteners 109, and an electrically conductive bushing 58 secured to the top wall 52 of the post member. A homeowner would typically separate the post member 24 from the base member 22 and remove the cover member 108 and gasket 78 from the post member. The base member 22 would then be placed in a suitable location on an outdoor structure such as a deck, and a line traced along the inside perimeter of the opening 48 (see FIG. 3) in the bottom end 26 of the base member. A hole is then drilled within the marked area.

Referring to FIG. 9, the base member 22 is then secured to the structure (not shown) by fasteners 30 through integral bosses 28. The hollow post member 24 including walls shaped to conform to the shape of the base side walls 32 is then placed near the secured base member 22, typically lying on one of its walls 50. A knockout 86 is then typically removed from the shelf 66 of the post member 24 and electrical cable 112 is fed through the hole in the structure, through the opening in the bottom end of the base member 22, and then through the post member 24 and knockout opening 86 in the shelf 66. At this point the cable 112 has been routed to the junction box 68 and the access port 70 is open. The post member 24 is then placed over the base member 22 with the front wall containing the access port 70 oriented in the direction preferred by the homeowner. Typically a homeowner would prefer the access port 70 and the electrical device 80 to face the center of a deck, patio, or similar area. The interior of the post member 24 is of a dimension to slip easily over the top 40 of the base side walls 32 and snugly fit the bottom 42 of the base side walls 32 to create a water tight fit. One or more fasteners 46 are then threaded through aperture 111 in the post member 24 and into aperture 44 in the base member 22 to secure the post member to the base member and therefore securely to the supporting structure (not shown). An electrical fixture, such as the light fixture 56 depicted in FIG. 9, may then be screwed into the electrically conductive bushing 58 in the top wall 52 of the post member 24. Wiring connections are then made between the electrical supply cable 112 and the light fixture 56 and between an electrical device, such as the duplex receptacle 80 shown in FIG. 9, and the cable 112. The electrical device can be any standard wall-mounted device. Fasteners 114 are then used to secure the receptacle 80 and gasket to the post member 24. The installation is completed by securing the complementary faceplate 82 to the installed electrical device 80 with fastener 116. The end result is deck post 20 with an enclosed junction box containing and protecting all internal wiring connections. The deck post 20 provides a durable, rain tight enclosure for housing a wide range of standard wall-mount electrical devices and a stable platform for supporting an electrical fixture such as a light.

The deck post of the present invention may be provided in many sizes to fit specific applications. A preferred embodiment such as depicted in the drawings would have an outer dimension across the walls of the post member of about 3.3 inches and an overall length of about 9.0 inches. The post member could however be manufactured in other lengths to provide a platform for mounting a fixture at heights lower or higher than the embodiment shown in the drawings.

The deck post is designed and constructed to accept line voltage, or 120-volt power, and devices and fixtures requiring line voltage. However, it also is acceptable for low-voltage devices and fixtures if preferred.

Suitable gasket materials may be any of the commonly available flexible waterproof materials, such as rubber (natural or synthetic), Neoprene™, Santoprene™, or other flexible and deformable elastomeric materials.

While the invention has been described by reference to the preferred embodiment disclosed herein, the invention is subject to considerable modification and may be tailored to fit the needs of many specific applications without departing from the scope or spirit of the claims, which are appended hereto.

What is claimed is:

1. An electrical enclosure and fixture mounting device for outdoor use, comprising:
   a base member;
   a hollow post member with walls having an interior surface and a top wall;
   said base member including a bottom end, side walls, and a top end;
   said bottom end including bosses for accepting fasteners;
   said base side walls having inner and outer surfaces;
   said outer surfaces of said base side walls sloped such that the top of said base side walls are of a smaller dimension than the dimension at the bottom of said base side walls;
   said hollow post member having said walls shaped to conform to the shape of said base side walls with said interior walls of said post member of a size to slip easily over the top of said side walls of said base and fit the bottom of said side walls of said base;
   an access port on said post member; and
   a shelf secured to said post member by:
      a. flanges on the outer edge of said shelf;
      b. bosses on the interior of said shelf;
      c. apertures in said flanges in alignment with apertures in said bosses;
      d. a thin-walled section on said walls of said post member at said bottom of said access port;
      e. apertures in said thin-walled section; and
      f. a channel between said flanges and said bosses with said channel slightly greater in size than said thin-walled section;
   such that said channel of said shelf may be fitted upon said thin-walled section with said aligned apertures in said flanges and said bosses in alignment with said apertures in said thin-walled sections whereby fasteners may be secured through said apertures and into said bosses.

2. An electrical enclosure and fixture mounting device for outdoor use, comprising:
   a base member;
   a hollow post member with walls having an interior surface and a top wall;
   said base member including a bottom end, side walls, and a top end;
   said bottom end including bosses for accepting fasteners;
   said base side walls having inner and outer surfaces;
   said outer surfaces of said base side walls sloped such that the top of said base side walls are of a smaller dimension than the dimension at the bottom of said base side walls;
   said hollow post member having said walls shaped to conform to the shape of said base side walls with said interior walls of said post member of a size to slip easily over the top of said side walls of said base and fit the bottom of said side walls of said base; and
   an access port on said post member;
   a fastening arrangement for securing said base member to said post member;
   an aperture in said top wall;
   an electrically conductive bushing secured in said aperture in said top wall;
   said bushing threaded interiorly and exteriorly and secured to said top wall by a correspondingly mated nut on the interior of said hollow post member;
   a shelf secured to said post member at the bottom of said access port to form an enclosure;
   said enclosure of a size to accept standard wall-mounted electrical devices including ground fault circuit interrupters;
   a cover secured to said post member over said access port; and
   a gasket secured between said cover and said post member whereby a standard wall-mounted electrical device may be secured within said enclosure and an electrical fixture may be secured to said bushing.

3. A method of providing a platform for the mounting of an electrical fixture and an enclosure for the mounting of electrical devices comprising the steps of:
   providing a base member including a bottom, side walls, an open top, an opening in said bottom, and two or more bosses with through bores in said bottom for accepting fasteners;

securing said base member to a deck or similar structure with fasteners through said bosses with through bores;

providing a hollow post member having walls shaped to conform to the shape of said base side walls with the interior of said post member of a size to slip easily over the top of said side walls of said base and snugly fit the bottom of said side walls of said base in a water tight fit;

providing said post member with a closed top end having an aperture therein and a bushing secured thereto;

providing an access port on said post member;

securing a shelf within said post member at the bottom of said access port to form an enclosure;

providing knockout areas in said shelf;

drilling a hole through said structure, said hole aligned within said opening in said bottom of said base member;

removing one of said knockouts to create an opening in said shelf;

running an electrical feed wire through said hole in said structure, through said opening in said bottom of said base, into the bottom of said post member, and through said opening in said shelf;

securing said post member to said base member by inserting fasteners through said walls of said post member and into said side walls of said base member;

securing an electrical fixture to said bushing;

securing a wall-mounted electrical device within said enclosure; and securing a gasket and cover member over said access port in said post member to seal said electrical device in a watertight fit within said enclosure.

* * * * *